US012182280B2

(12) United States Patent
Ball et al.

(10) Patent No.: US 12,182,280 B2
(45) Date of Patent: Dec. 31, 2024

(54) DATA TRANSFORMATION ENGINE

(71) Applicant: Data Solutions LLC, Boca Raton, FL (US)

(72) Inventors: Loren John Ball, Boca Raton, FL (US); Eduardo Bayudan, Bedminster, NJ (US)

(73) Assignee: Data Solutions LLC, Boca Raton, FL (US)

( * ) Notice: Subject to any disclaimer, the term of this patent is extended or adjusted under 35 U.S.C. 154(b) by 202 days.

(21) Appl. No.: 17/705,637

(22) Filed: Mar. 28, 2022

(65) Prior Publication Data
US 2023/0306125 A1     Sep. 28, 2023

(51) Int. Cl.
*G06F 21/60* (2013.01)
*G06F 16/11* (2019.01)

(52) U.S. Cl.
CPC .......... *G06F 21/606* (2013.01); *G06F 16/116* (2019.01)

(58) Field of Classification Search
CPC ............................ G06F 21/606; G06F 16/116
See application file for complete search history.

(56) References Cited

U.S. PATENT DOCUMENTS

| 2008/0030759 A1* | 2/2008 | Tanaka | G06F 16/116 |
| | | | 358/1.13 |
| 2008/0059398 A1* | 3/2008 | Tsutsui | G06F 16/116 |
| 2021/0224223 A1* | 7/2021 | Muramoto | G06F 16/116 |

FOREIGN PATENT DOCUMENTS

WO       2019227011 A1     11/2019

* cited by examiner

*Primary Examiner* — Khoi V Le
(74) *Attorney, Agent, or Firm* — Robert C. Kain, Jr.; Scott D. Smiley; Scott M. Garrett

(57) ABSTRACT

The data transformation method operates discrete input data sources DF-in each having df-in data fields carrying to-be-converted data (tbc-data). Initial steps identify tbc-data field and characteristics; output discrete output (df-out) with predefined df-out data fields for converted data (conv-data); and maps or look-up tables for relationships between df-in data fields and df-out data fields. Process activates: SFTP App in the presence df-in and transfers df-in to unstructured data blob; and App copying the df-in from blob to file share archive; first orchestrating sequence App to validate df-in data based upon conversion rules. If INVALID, App generates error entry. If VALID, App converts tbc-data into conv-data with conversion rules and mapping orchestrating App populates df-out data fields with conv-data resulting converted df-out in the blob. A second orchestrating App transfers converted df-out to destination store. Copying App copies converted df-out from blob to archive and deletes converted df-out from blob.

8 Claims, 10 Drawing Sheets

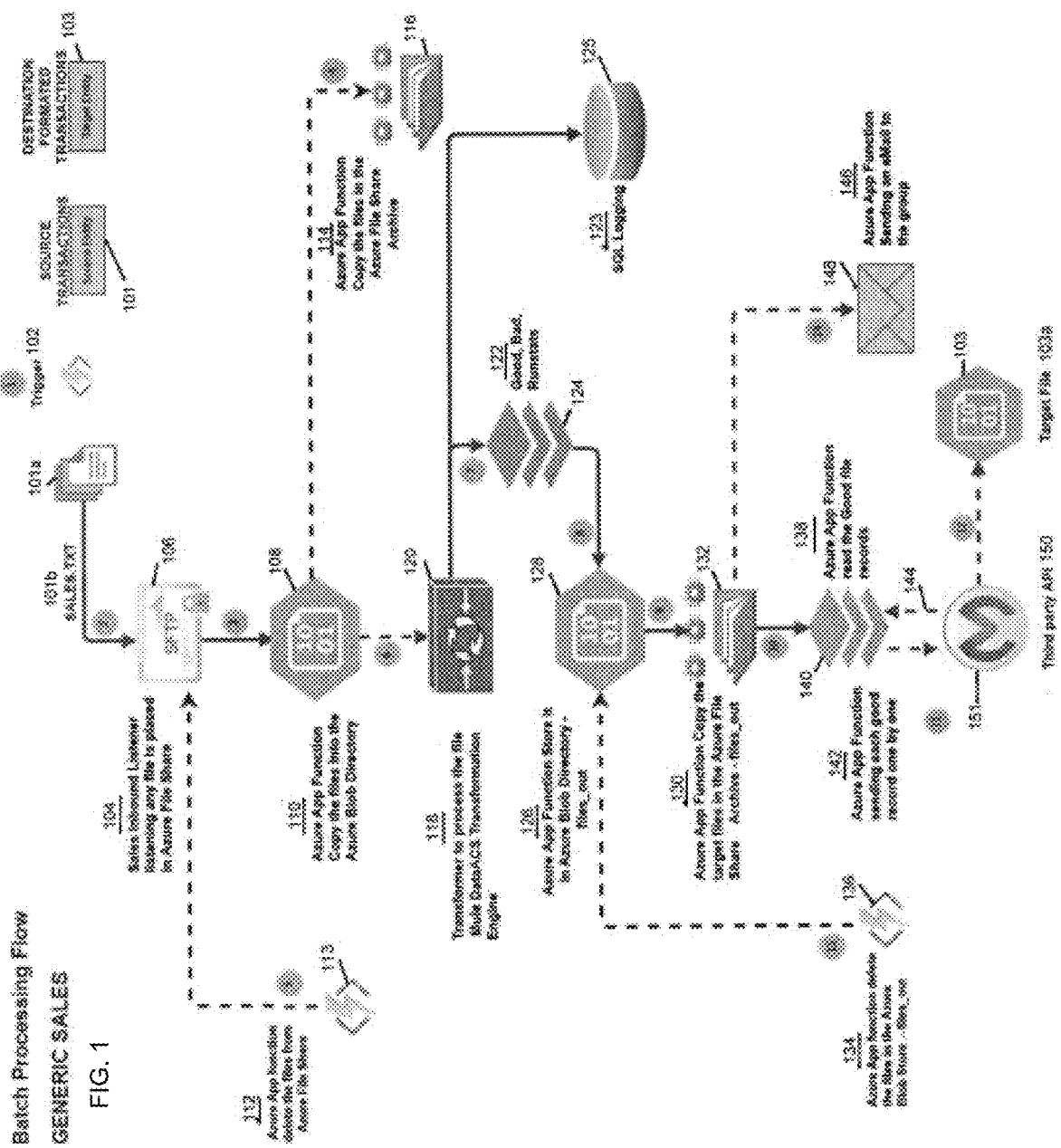

FIG. 2

| Ingestion Rule | Description |
| --- | --- |
| RUNVAR[runID] | Use generated value runID |
| LIST[1,2,3] | Accept only 1,2,3 |
| CUSTOMRULE0005[inField003,inField015,inField013,inField014|inField012] | Custom rule for validating TRAN_TYPE |
| TRANSLATECLIENTPRODUCT[inField003] | Translate product number using Product Master |
| CUSTOMRULE0004[inField003,inField016,inField012|inField003] | Custom rule for validating PRODUCT_PARENT |
| PADLEFT[0,inField006,5] | Used to fill a field value left with a character for a specific length. |
| GENERATE[ASCENDINGGLOBAL] | Generate a sequential number for every target record |
| DATE[YYYYMMDD,DD-MMM-YYYY] | Convert input date format |
| DECIMAL[13,7] | Validate the input format/size |
| STRING[6] | Validate the input format/size |
| STRING[3] | Validate the input format/size |
| LIST[CLR,ICI,CEU] | Accept only CLR,ICI,CEU |
| LIST[CLR,ICI] | Accept only CLR,ICI,CEU |
| STRING[3] | Validate the input format/size |
| INTEGER[11] | Validate the input format/size |

```
TRANS_SESSION|TRANS_SEQUENCE|TRANS_ORG_CHILD|TRANS_PRD_CHILD|TRANS_TRN_CODE|TRANS_TYPE_CODE|TRANS_DATE|INV_MRPT_C
22031813030313|1|||98||01|20210208|SS|01|GBP|4000513|1012846||CONC||||1|5.000|0.40310|0.83000|||||||1|||||||1|||||||
22031813030313|2|||98||01|20210208|SS|01|GBP|4000513|1013530||CONC||||1|8.000|0.97995|1.33000|||||||1|||||||1|||||||
22031813030313|3|||98||01|20210208|SS|01|GBP|4000513|1016215||CONC||||1|4.500|0.62550|0.75000|||||||1|||||||1|||||||
22031813030313|4|||98||01|20210208|SS|01|GBP|4000513|1022648||CONC||||1|4.500|0.43785|0.75000|||||||1|||||||1|||||||
22031813030313|5|||98||01|20210208|SS|01|GBP|4000513|1025019||CONC||||1|8.000|1.01470|1.33000|||||||1|||||||1|||||||
22031813030313|6|||98||01|20210208|SS|01|GBP|4000513|1034844||CONC||||1|8.000|0.35445|1.33000|||||||1|||||||1|||||||
```

Fig. 3A

```
TRANS_SESSION|TRANS_SEQUENCE|TRANS_TRN_CODE|TRANS_TYPE_CODE|TRANS_DATE|INV_MRPT_CODE|INV_DRPT_CODE|TRANS_C
URR_CODE|TRANS_ORG_LVL_NUMBER|TRANS_PRD_LVL_NUMBER|TRANS_PROC_SOURCE|TRANS_QTY|TRANS_RETL|TRANS_COST|TRANS_VAT|T
RANS_UOM|Division|CLRorICI|StoreNumber|ProductNumber|DeptCode|ShortCode|11DigitNumber
2021072272|1|11|01|20210208|SS|01|GBP|||CONC|2|6.000|0.50735|1.00000|EA|CEX|CLX|2235|05326402708|12|02708|99
5326402708
2021072272|2|11|01|20210208|SS|01|GBP|||CONC|1|3.500|0.22240|0.58000|EA|CEX|CLX|2235|05326406954|12|06954|99
5326406954
2021072272|3|11|01|20210208|SS|01|GBP|||CONC|1|4.500|0.34750|0.75000|EA|CEX|CLX|2235|05326408129|12|08129|93
26408129
2021072272|4|11|01|20210208|SS|01|GBP|||CONC|1|5.000|0.40310|0.83000|EA|CEX|CLX|2235|05326411612|12|11612|9
9326411612
2021072272|5|11|01|20210208|SS|01|GBP|||CONC|1|8.000|0.97995|1.33000|EA|CEX|CLX|2235|05326412155|27|12155|9
9326412155
2021072272|6|11|01|20210208|SS|01|GBP|||CONC|1|8.000|0.97995|1.33000|EA|CEX|CLX|2235|05326412176|27|12176|99
326412176
2021072272|7|11|01|20210208|SS|01|GBP|||CONC|1|4.500|0.62550|0.75000|EA|CEX|CLX|2235|05326414248|12|14248|9
9326414248
2021072272|8|11|01|20210208|SS|01|GBP|||CONC|1|4.500|0.43785|0.75000|EA|CEX|CLX|2235|05326419464|12|19464|9
9326419464
2021072272|9|11|01|20210208|SS|01|GBP|||CONC|1|8.000|1.01470|1.33000|EA|CEX|CLX|2235|05326421344|27|21344|9
9326421344
2021072272|10|11|01|20210208|SS|01|GBP|||CONC|1|8.000|0.35445|1.33000|EA|CEX|CLX|2235|05326429335|08|29335|
99326429335
```

Fig. 3B

TRANS_SESSION|TRANS_USER|TRANS_BATCH_DATE|TRANS_SOURCE|TRANS_STATUS|TRANS_AUDITED|TRANS_FEED|BRK_SESSION|POS_SESSION
20031813030313|DEFAULT|20220318|DAILY_SALES_REPORT|S|T|0|0|0|0|0|0

Fig. 3C

```
Record 2 has 1 error(s).        field:ProductNumber/inField020=>12|CLR|0532640270,12|CLR|532640270 did not
translate, ingestionRule:TRANSLATECLIENTPROD[inField021,inField018,inField020]
SOURCE RECORD:
202107272|1|11|01|20210208|SS|01|GBP|||CONC|2|6.000|0.50735|1.00000|EA|CEU|CLR|2235|0532640270|12|02708|05326402
998
Record 3 has 1 error(s).        field:ProductNumber/inField020=>12|CLR|0532640695,12|CLR|532640695 did not
translate, ingestionRule:TRANSLATECLIENTPROD[inField021,inField018,inField020]
SOURCE RECORD:
202107272|2|11|01|20210208|SS|01|GBP|||CONC|1|3.500|0.22240|0.58000|EA|CEU|CLR|2235|0532640695|12|06954|05326406
994
Record 4 has 1 error(s).        field:ProductNumber/inField020=>12|CLR|0532640819,12|CLR|532640819 did not
translate, ingestionRule:TRANSLATECLIENTPROD[inField021,inField018,inField020]
SOURCE RECORD:
202107272|3|11|01|20210208|SS|01|GBP|||CONC|1|4.500|0.34750|0.75000|EA|CEU|CLR|2235|0532640819|12|08129|05326409
929
Record 7 has 1 error(s).        field:ProductNumber/inField020=>27|CLR|0532641216,27|CLR|532641216 did not
translate, ingestionRule:TRANSLATECLIENTPROD[inField021,inField018,inField020]
SOURCE RECORD:
202107272|6|11|01|20210208|SS|01|GBP|||CONC|1|8.000|0.97995|1.33000|EA|CEU|CLR|2235|0532641216|27|12176|05326992
176
```

Fig. 4A

RUN STATS:
[
    {
        "in_ct": 11,
        "end_date": "2022-03-18T07:33:50.827",
        "st_date": "2022-03-18T07:33:19.087",
        "elapsed_time": 0.516666,
        "invalid_ct": 4,
        "total_ct": 10,
        "uuid": "a14bc540-8cbe-42ee-9be8-b31549ebe21c",
        "valid_ct": 6
    }
]

Fig. 4B

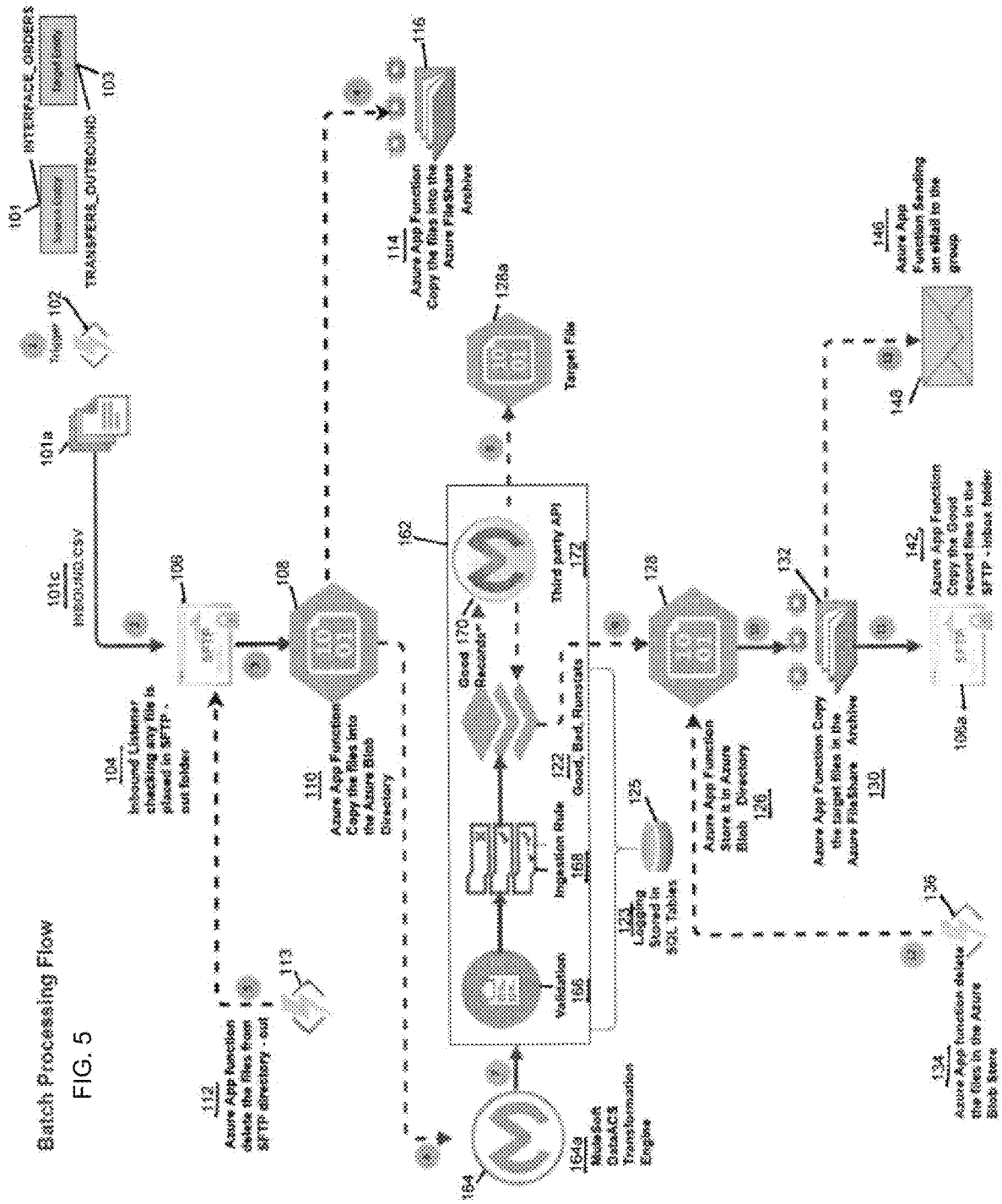

FIG. 6A

| SOURCE_COL_NAME | TARGET_COL_NAME | SOURCE_INGESTION_RULE |
|---|---|---|
| TECH_KEY | TECH_KEY | INTEGER[12] |
| AUDIT_NUMBER | AUDIT_NUMBER | INTEGER[12] |
| TRF_NUMBER | ORDER_ID | CONCAT[inField049,-BY,inField003] |
| PRD_LVL_CHILD | PRD_LVL_CHILD | INTEGER[12] |
| PRD_LVL_MASTER | PRD_LVL_MASTER | INTEGER[12] |
| CARRIER_NAME | CARRIER_NAME | STRING[30] |
| MNFST_NUMBER | MNFST_NUMBER | STRING[48] |
| CARTON_NUMBER | CARTON_NUMBER | STRING[48] |
| PRD_LVL_NUMBER | PRD_LVL_NUMBER | STRING[15] |
| PRD_MST_NUMBER | PRD_MST_NUMBER | STRING[15] |
| DATE_CREATED | DATE_CREATED | DATE[YYYYMMDDHHMMSS] |
| TRF_TYPE_CODE | TRF_TYPE_CODE | STRING[2] |
| TRF_REASON_CODE | TRF_REASON_CODE | STRING[2] |
| FROM_LOC | FROM_LOC | INTEGER[12] |
| TO_LOC | TO_LOC | INTEGER[12] |
| QUANTITY | QTY_ORDERED | DECIMAL[10,3] |
| ACTION_CODE | ACTION_CODE | STRING[3] |
| PO_NUMBER | PO_NUMBER | INTEGER[12] |
| RECV_SESSION | RECV_SESSION | INTEGER[12] |
| EXPECT_RECPT_DATE | EXPECT_RECPT_DATE | DATE[YYYYMMDDHHMISS] |
| REFERENCE | REFERENCE | STRING[20] |
| TRF_TRACK_NUM | TRF_TRACK_NUM | STRING[20] |
| TRF_CARTON_WGT | TRF_CARTON_WGT | DECIMAL[10,3] |

FIG. 6B

| DOWNLOAD_DATE_1 | DOWNLOAD_DATE_1 | STRING |
|---|---|---|
| DOWNLOAD_DATE_2 | DOWNLOAD_DATE_2 | STRING |
| NOTES | NOTES | STRING[2000] |
| LEGACY_PRODUCT_NUMBER | SKU_ID | PADLEFT[0,inField047,5] |
| FROM_LEGACY_STORE_NUMBER | FROM_LOC_LEGACY_NUMBER | STRING[50] |
| TO_LEGACY_STORE_NUMBER | TO_LOC_LEGACY_NUMBER | STRING[50] |
| PENNINE_11_DIGIT | USER_DEF_TYPE_2 | STRING[15] |
| INNER_PACK_QTY | USER_DEF_TYPE_1 | STRING[15] |
| DUMMY01 | DUMMY | STRING |
| DUMMY02 | RECORD_TYPE | STRING |
| DUMMY03 | MERGE_ACTION | STRING |
| DUMMY04 | LINE_ID | GENERATE[ASCENDINGLOCAL] |
| DUMMY05 | CONFIG_ID | STRING |
| DUMMY06 | TRACKING_LEVEL | STRING |

DATA TRANSFORMATION ENGINE

This is a non-provisional patent application based upon and claiming the benefit of provisional patent application Ser. No. 63/167,529, filed Mar. 29, 2021, the contents of which is incorporated herein by reference thereto.

The present invention is a transformation engine ("Tx-Engine") converting documents, files, databases, and data objects (sometimes referred to herein collectively as "D-source") into user-defined documents, files, databases and organized data stores (this transformed, converted data collectively sometimes referred to herein as "DTx"). The Tx-Engine uses a series of mapping sheets to define the transformation of an input source D-source to an output source DTx using rules.

BACKGROUND OF THE INVENTION

It is difficult for companies to convert existing files and or databases (D-source materials) to a new layout and or convert D-source into new databases on a quick and easy basis. Some prior art solutions use large complex rules, which require additional environments to run.

The invention solves the data conversion process when the end-user wishes to convert many types of D-sources into one or more DTx's, quickly and easily.

SUMMARY OF THE INVENTION

The inventive solution converts from a database or an initial file (these discrete data objects being D-sources) to another file or another database (these being DTx's), or converts the first D-source into many DTx files or many DTx databases, and converts many D-sources to one DTx file or many D-sources to many DTx's.

The inventive solutions provide the ability to easily define the file layout or database structure of an input file with the use of user-defined mapping sheets or maps.

The inventive solution further defines the output structure of a file or database in user-defined maps or mapping sheets.

The inventive solution also employs user-defined rules that identify what the D-source format is, what are valid field values, mapping tables, lookup values in lookup tables, and transformations using simple mapping metadata in a spreadsheet.

BRIEF DESCRIPTION OF THE DRAWINGS

Further objects and advantages of the present invention can be found in the detailed description of the embodiments of the invention when taken in conjunction with the following drawings.

FIG. 1 diagrammatically illustrates a flowchart for the data transformation process.

FIG. 2 illustrates examples of ingestion rules.

FIG. 3A shows and example of an input file, D-source.

FIG. 3B shows an example of an output file transformed from the input file of FIG. 3A.

FIG. 3C shows an example of the header file related to the examples in FIGS. 3A and 3B.

FIG. 4A shows an example of an error file.

FIG. 4B shows an example of a run statistics file.

FIG. 5 diagrammatically illustrates a flowchart for the data transformation process as well as the validation, ingestion and output by the conversion module.

FIGS. 6A and 6B diagrammatically show mapping ingestion rules. These mapping rules show data source, d-source, and in the left column, the source column name, the DTx or data target column name, in the middle column, and the ingestion rule applied to the data input file column, in the right column.

DETAILED DESCRIPTION

The present invention relates to a data transformation method, process and system. The solutions presented by the invention provide the ability to easily define the file layout or database structure of an input file in mapping sheets. It further defines the output structure of a file or database in mapping sheets. The user further defines rules that identify what the format is, valid field values, lookup values, and transformations using simple mapping-metadata in the spreadsheet. This simple approach can be completed in a very short amount of time.

The invention differs from what currently exists. This invention requires no complex tools to be used and does not require complex environments. Simply define the rules in a spreadsheet and transform files. This invention is an improvement on what currently exists. This invention requires no complex tools to be used or understood by the user and does not require complex environments. The user simply defines the rules in a spreadsheet and then the invention transforms the source files and databases into the desired DTx's.

The inventive solution provides enables the user to avoid a lot of analysis to populate the rules and understand the complexity of the input and output.

The invention uses simple processes and common formats like an Excel spreadsheet permitting the user to set up the conversion process.

The invention can interface with many different sources and run on many types of environments.

One embodiment is generally described by the following steps.

Step 1. Define the input source D-source and the data fields in the input doc (the data fields a single document in D-Source).

Step 2. Define the destination DTx and the DTx fields or column names.

Step 3. Is data in the DTx column required: YES or NO.

Step 4. Data Field Value Test: If data required in DTx column, user, at initialization, defines a default value if the subject DTx cell or data entry field requires a default value when the D-source cell or data element is empty. If the user does not specify the default value or a user-defined value range, then Step 3 is marked-FAILURE for the D-source record being processed.

Step 5. Data Field Map or Look-up Table Test: The user, at initialization, defines mapping tables or look-up rules which define DTx fields and, if there is a look-up table, the transformer engine converts the data cell field value from the D-source value to a DTx defined value based on the look-up table or the mapping table.

Step 6. Data Field Length Test: If the D-source data element, cell, or field has a fixed length, such as a fixed character field length, the user, at initialization, identifies the input D-source cell field subject to conversion, a start point and an end point of the fixed field. The step 6 process involves processing data for a fixed field length, and this process operates on the input-side or on the output-side of the data transformation.

Step 7. File Output: The user defines the sequence of file output (the sequence of every field in the output, not the file conversion sequence) and the output format, such as DTx file or DTx database, one-to-one output, one-to-many outputs, many-to-many outputs, many-to-one output.

The relationship between the components is generally described herein. D-source files and D-source file input columns are defined in Step 1. The DTx output and columns are defined in Step 2. If data is required in a column or cell per Step 3, D-source file is read, Step 1 is applied, then Step 3 is applied. If D-source cell is empty and DTx cell data is required, the conversion fails and a FAILURE FAULT NOTICE is generated. If Step 3 requires a cell value and the D-source cell is empty, then default value in Step 4 is used. If there is a conversion, Step 5 is applied. If Step 5 activates a LOOKUP function, the value is looked up in the table and the result replaces the D-source input for that converted cell and the default value is posted to the DTx cell. If not found in the LOOKUP, the conversion fails. If the D-source cell or DTx cell must have a fixed field length, Step 6 is applied. Finally, Step 7 is used to sequence the output fields in the DTx file or DTx database table.

The invention is further generally described as follows. The transformation engine spreadsheet is defined in a standard format using an Excel program. A script is used to load this spreadsheet into a table. The spreadsheet defines all the rules in a handful of columns; no complex knowledge is needed. By mixing and matching simple rules, user can convert, transform, rearrange, copy, or output any number of columns to any number of required output files or a single database. An API is called with the name of the file to be converted and points to the mapping sheet created in the first step. The process creates an output DTx file or DTx database, an error file and a record count log file. The record count shows the number of D-source cells converted into the DTx output. Plus, the solution can convert from one database or one file, to one file or one database, or one-to-many, or many-to-one, or many-to-many.

The data process can be further described as follows. (A) IF value empty and it is required, THEN check for default, IF empty fail, ELSE replace with default. (B) IF format invalid, THEN fail. (C) IF a lookup value from the table is not found, THEN fail, ELSE use the lookup return value. (D) IF the format of input data invalid, THEN fail, ELSE convert to a new value format. (E) The data transformation engine can apply data separators or delimiters.

A further example uses an Excel spreadsheet. The data transformation engine for the DTx follows the example based on the original Excel file. THEN load that Excel file into a database. The data engine will create an output DTx just like the user defined, or the data engine will create an error file that describes in simple terms what data does not conform to the definition in the mapping rules.

The fixed-length columns, in Step 6 above, are only required for fixed-length files.

A file can be run through this transformation process, and if needed, the user can identify errors in the error file, alter the initially defined conversion/transformation rules and re-run the data through the transformation engine.

Another example of the general operation of the data transformation is shown in FIG. 1. Step 1. The general process has a General Ledger (GL) Inbound Listener [Azure™] Function App (herein A-Listener App) 102 which listener effects a secure file transfer, SFTP 106 (Step 2), of Sales.txt 101b (to-be-converted data, tbc-data) from D-source 101a. D-source 101a represents discrete data files 101a, sometimes called df-in. In Step 3, A-Listener Function App 104 copies Sales.txt files 101b to a large data storeBlob Store 108 (for example, Azure™ Blob Store). In Step 4, function App 114, copies these discrete data files to a backup data store, File Share Archive 116 (e.g., Azure™ File Share Archive). This backup function using Copy App function 114. In Step 5, Azure™ Function App 112 deletes df-in file from SFTP File Share 106 directory. In this manner, this data extraction from the SFTP File Share Store enables data flow tracking.

In Step 6, an A-Listener Function App 114, upon detection of delete files from SFTP, calls a Transformer Function App 118. In Step 6, Transformer Function App 118 calls a cloud-based enterprise platform, such as a MuleSoft™ API service platform, and the M-Transformer App 118 (the MuleSoft™ data transformer) processes Sales.txt df-in from the Blob Store 108 (a transformer operation on D-source). The transformation is shown in function block 120. In Steps 7 and 8, the M-Transformer App 118 creates converted data (conv-data) for output to output DTx target files (these target output files 124 being DTx good, DTx bad, and statistic data "Run Stats" DTx file, collectively the function 122) in Blob Store 128. The post-processed files are sometimes referred to as "Files out" in FIGS. 1 and 5 and are stored in Blob store 128 as Files_out (conv-data) by function 126. In Step 9, Azure™ Transformer Function App 130 copies all DTx target files 140—to File Share Archive 116. In Step 10, A-Transformer Function App 142 copies all good DTx files 140 to third party target file location 103a via the output function 151 (Step 11)-. The third party target location 103a, for converted data target file 103a, being the final DTx Data Store (DTx Store) which, in FIG. 1 is the target entity data store 103.

Step 8 has several sub-steps included therein. Sub-Step 8.1 applies Azure™ Function App 122, 124 reads good file records in Blob Store 128. Sub-Step 8.2 sends each good DTx record to Mule API 151, 150 for third party transfer which effects the file output operation. For example, the DTx output can be one-to-one file conversion (for example, one single page data file df-in to a single page output data file df-out, or one input database to one converted output database), one-to-many file conversion (for example, one database to many single page data output files, or one input database to many converted output databases), many-to-one file conversion (for example, many input databases to one single page data output file, or many input databases to one converted output database), many-to-many file conversion (for example, many single page input data files to many single page output data files, or many input databases to many converted output databases). In Sub-Step 8.3, Mule API 150, 151 creates target DTx files as dictated by user (see Sub-Step 8.2). Mule API 150, 151 transfers the DTx files to the final target data store 103.

In Step 9, A-Transformer Function App 134 deletes all files_out from Blob Store 128. In Step 10, App function 146 sends email 148 to the user. Email 148 indicates DTx good, DTx bad, and statistic "Run Stats" DTx file.

The present invention relates to a data transformation method and system. While the specification concludes with claims defining the features of the invention that are regarded as novel, it is believed that the invention will be better understood from a consideration of the following description when taken in conjunction with the FIG.s. Similar numerals designate similar items and all the FIG.s. It is to be understood that the disclosed embodiments are merely exemplary of the invention, which can be embodied in various forms.

FIG. 1 diagrammatically illustrates a flowchart for the data transformation process. Initially, the user or the user's programmer identifies the data source entity 101 which is designated in FIG. 1 as Source Transactions. Also initially, the user identifies a target entity 103, called Destination Formatted Transactions. A trigger application (App) 102 is activated when the discrete data input file 101a (df-in), identified as Sales.txt 101b, enters the data transformation process. App 104 is a Sales inbound listener function that determines whether any file is placed in the file share transfer process function (SFTP) 106. These inbound files to the SFTP either consist of a discrete data file or a discrete database. The data transformation process operates on a plurality of discrete data files and a plurality of discrete databases, one at a time, as files df-in. The SFTP 104, 106 transfers the df-in to a large data store 108. As in example, an Azure™ blob may be utilized. Other blob data stores may be used. App function 110 inputs df-in into blob 108. Another app function 112 deletes the file from the SFTP data store based upon function trigger 113. App function 114 copies df-in from the data store 108 into an archive file 116, as an archive file.

An orchestrating performance sequence App 118 transforms the data in each df-in data field, thereby transforming the to-be-converter data (tbc-data) into converted data (conv-data) having an acceptable output data format and placing that then-converted tbc-data (the conv-data) into a predefined data field in a predefined output data file. The plurality of outputs discrete data file and discrete databases are sometimes referred to as df-out. The data transformer app 118 operates transformer engine 120 as discussed later in connection with FIG. 5.

The outputs of data transformer engine 120 includes "good" converted df-out file (conv-data), and "bad" non-converted df-out files. Those bad files potentially having partially successfully converted data conv-data therein and unsuccessfully transformed "bad" data therein, or having some other type of conversion error or input field error, or completely FAILED all data conversion operation. Conversion statistics are generated in function 122 and also logged-in by data transformer app 118 into data logging function 123 into event log database 125.

Another orchestrating performance sequence App 126 stores the "good" files in blob data store 128. These are sometimes referred to as converted df-out data files (df-out files with conv-data in the output fields). Function App 130 copies the converted target file 132 from—data store blob 128 and stores those converted df-out files in the file share archive using SFTP protocol. The df-out files 140 are acted upon by transfer function App 142 according to a predefined output function. Output process 144 is governed by third party API 150 designated as function 151. The output df-out is provided in an earlier defined or formatted output file and is df-out is stored in target entity data store 103 as target file 103a.

When transfer function App 130 is activated, another deletion function App 134 is activated, as shown by trigger function 136, to delete the files in the unstructured blob data store 128. As shown in FIG. 1, deletion App function 134 operates on files_out which were earlier stored in blob data store 128.

The data transformation method in FIGS. 1 and 5 includes operating on a plurality of input data sources (d-s, Sales.txt in FIG. 1, Interface Orders in FIG. 5) which includes a plurality of discrete data files and discrete databases (df-in). Each input data file df-in has a plurality of df-in data fields. The df-in data fields each have to-be-converted data (tbc-data). The user, prior to transformation, identifies each tbc-data field and certain characteristics of that tbc-data field. For example, tbc-data fields are pre-identified as potentially having tbc-data field lengths, tbc-data formats, tbc-data data value limits, tbc-data null values, and "tbc-data present conditions" (meaning that some data must be present in the tbc-data field).

FIG. 2 shows examples of ingestion rules.

FIGS. 6A and 6B show examples of mapping rules or lookup tables. In the left-side column, tbc-data column names which column names effectively are tbc-data fields in the to be converted data file. The user, pre-transformation, confirms these tbc-data field names. If the df-in is a discrete database, then the tbc-data field names are the column designators. All df-in data files contain computer readable or discoverable data. The tbc-data format may further include a tbc-data type which is one or more of a numeric, alpha-numeric, and non-numeric data type. As discussed later, the data transformation process first validates the tbc-data in each field in the df-in data file to determine compliance (or ERROR) with predefined tbc-data field length, tbc-data format, tbc-data data value limit, tbc-data null value, tbc-data present condition, and tbc-data type (numeric, alpha-numeric, and non-numeric). Df-in with validation errors as marked "bad" in function 122 and an error log is created in function 123 and the error log data is stored in SQL data store 125.

FIG. 2 shows examples of ingestion rules. FIGS. 6A and 6B shows mapping rules matching converted data fields in the middle column. In the right column, the ingestion rule file function is listed in order to convert df-in data fields into conv-data fields. These conversion or ingestion rules include conv-data field length, conv-data format, conv-data data value limits, conv-data null values, and a rule to mark the "no data found in field" rule, which is the tbc-data present error condition. The middle column provides examples of initially defined df-out data fields, each df-out data field designated for converted data (conv-data) from an df-in data field. In the example, the right column identifies predefined data field maps or data look-up tables which define relationships between each df-in data field and the corresponding df-out data field.

Returning to FIG. 1, the data transformation process activates a SFTP application (App) 104 for a secure file transfer function SFTP 106 in the presence of df-in. Df-in is one of a plurality of discrete data files or one of a plurality of discrete databases (d-source). SFTP 106 transfers the d-source into the large data unstructured data blob store 108. Copy App 112, 113 copies the d-source from blob 108 to file share archive 114, 116 resulting in an archived version of d-source (archive file_in in FIG. 1A).

FIGS. 3A, 3B, 3C, 4A, 4B, 5, 6A and 6B are discussed concurrently herein. FIG. 3A shows an example of an input file, D-source. FIG. 3B shows an example of an output file transformed from the input file of FIG. 3A. FIG. 3C shows an example of the header file related to the examples in FIGS. 3A and 3B. This header file is stored for good and bad conversion efforts. FIG. 4A shows an example of an error file. FIG. 4B shows an example of a run statistics file. FIG. 5 diagrammatically shows a flowchart for the data transformation process as well as the validation, ingestion and output by the conversion module. FIGS. 6A and 6B diagrammatically show additional mapping ingestion rules.

Referring to FIG. 5, the transformation process activates Apps in the MuleSoft™ API enterprise platform. Other API enterprise platforms can be used. These platforms provide API connectivity to data stores to execute pre-programmed functions on the df-in files in the blob 108. These integration platforms are used for APIs as well as SaaS platforms.

In FIG. 5, transformation function module 162 is triggered by the App 164, 164a operating on a discrete input file, df-in. App 166 is a first orchestrated performance sequence App which validates the tbc-data in the plurality of df-in data fields based upon the predefined conversion rules provided by the user. See examples of ingestion rules in FIG. 2. If tbc-data in the df-in data fields is invalid, App 166 generates a corresponding error log entry, then the error is logged via function 123 in database 125 (FIG. 1A, 1B). Run statistics and VALID conversions are also logged into database 125 by App 123.

Transformation engine module 162 operates with the initially defining data field ingestion rules including ingestion-data (i-d) field length, i-d data format, and i-d data data value limits. The data field ingestion rules further include one or more data field maps or look-up tables (see ingestions examples in FIG. 2 and mapping rules in FIGS. 6A, 6B) which define relationships between df-in data fields and df-out data fields and call up algorithmic operations on df-in data fields to convert the df-in data in a specified df-in data field to conv-data for corresponding df-out data fields. In operation 168, the data field ingestion rules generate conv-data for corresponding df-out data fields. Good, bad and run-stats function 122 are logged in data store 125 by logging App 123. Df-out of good records 170 triggers third party API 172, 162 to store good records in blob 128a as the target files.

In FIG. 5, if tbc-data in the df-in data field is valid, App 168 ingests the df-in data field and converts the tbc-data into conv-data with the conversion or ingestion rules. FIG. 2 shows examples of ingestion rules. FIGS. 6A and 6B show additional mapping ingestion rules. A mapping orchestration performance sequence App 122 generates the transformation log data. Good files marked files_out are stored in blob 128a. A second orchestrating performance sequence App 126, 128 transfers converted df-out to a df-out destination data store 103 (FIGS. 1, 5) via the sftp-App 130, 132. STFP function 106a and App transfer function 142 sends the good files to target file 103 (FIGS. 1, 5) from the blob store.

Concurrently, App 134, 136 copies converted df-out from the blob 128 to the file share archive 116 resulting in an archive df-out. Also, App 134, 136 deletes converted df-out from the blob store 128. Once transferred, the files_in in blob store 128 are deleted because that data store then contains files out.

FIG. 3A shows an example of an input file, D-source, examples of df-in data field names. FIG. 3B shows an example of an output file transformed from the input file of FIG. 3A and the df-out data field names. FIG. 3C shows an example of the header file related to the examples in FIGS. 3A and 3B. This header file is stored for good conversion efforts (reported to the user in function 146, 148) and bad conversion efforts (also reported to the user in function 146, 148 as an error). SQL database 123, 125 (FIG. 1) stores this log data. FIG. 4A shows an example of an error file. FIG. 4B shows an example of a run statistics file (also reported to the user in function 146, 148). The third orchestrating performance sequence App 146, 148 transmits the error log (FIG. 4A) and a validation report (FIG. 4B) to the user.

The claims appended hereto are meant to cover modifications and changes within the scope and spirit of the present invention.

What is claimed is:

1. A data transformation method comprising:
operating on a plurality of input data sources (d-s) comprising a plurality of discrete data files and discrete databases (df-in), each df-in having a plurality of df-in data fields each with to-be-converted data (tbc-data);
initially defining data field conversion rules including tbc-data field length, tbc-data format, tbc-data data value limits, tbc-data null values, and a tbc-data present condition;
initially defining a plurality of output discrete data files and discrete databases (df-out), each df-out having a plurality of df-out data fields for converted data (conv-data);
initially defining one or more data field maps or look-up tables which define relationships between df-in data fields and df-out data fields;
activating an application (App) for secure file transfer function (sft-App) in the presence of one of the plurality of discrete data files or discrete databases (cl-source) which transfers the cl-source into a large data store for unstructured data (blob);
activating a copy App copying the cl-source from the blob to a file share archive resulting in an archive cl-source;
activating a first orchestrating performance sequence App on cl-source validating the tbc-data in the plurality of df-in data fields based upon the conversion rules;
generating corresponding error log entry when tbc-data in the plurality of df-in data fields is invalid;
converting the tbc-data into conv-data with the conversion rules and activating a mapping orchestrating performance sequence App which populates the plurality of df-out data fields with corresponding conv-data resulting in a converted df-out in the blob when tbc-data in the plurality of df-in data fields is valid;
activating a second orchestrating performance sequence App transferring converted df-out to a df-out destination data store via the sft-App; and
copying converted df-out from the blob to the file share archive resulting in an archive df-out and then deleting converted df-out from the blob.

2. The data transformation method as claimed in claim 1 wherein the tbc-data format comprises a tbc-data type which one or more of a numeric, alpha-numeric, and non-numeric.

3. The data transformation method as claimed in claim 1 wherein the generation of corresponding error log entry including identifying error type, and the method includes activating a third orchestrating performance sequence App transmitting the error log with a validation report to a user.

4. The data transformation method as claimed in claim 1 including generating corresponding error log entry for an error of the tbc-data present condition in the d-source.

5. A data transformation method comprising:
operating on a plurality of input data sources (d-s) comprising a plurality of discrete data files and discrete databases (df-in), each df-in having a plurality of df-in data fields each with to-be-converted data (tbc-data);
initially defining data field conversion rules including tbc-data field length, tbc-data format, and tbc-data data value limits; initially defining a plurality of output discrete data files and discrete databases (df-out), each df-out having a plurality of df-out data fields for converted data (conv-data);
initially defining one or more data field maps or look-up tables which either (i) define relationships between df-in data fields and df-out data fields and (ii) algorithmic operations on df-in data fields to generate conv-data for the corresponding df-out data field;
activating an application (App) for secure file transfer function (sft-App) in the presence of the one of the plurality of discrete data files or discrete databases (cl-source) which transfers the cl-source into a large data store for unstructured data (blob);

activating a copy App copying the cl-source from the blob to a file share archive resulting in an archive cl-source;

activating a first orchestrating performance sequence App on cl-source validating the tbc-data based upon the conversion rules;

generating corresponding error log entry when tbc-data in a corresponding df-in data field is invalid;

converting the tbc-data into conv-data with the conversion rules and activating a mapping orchestrating performance sequence App which populates the plurality of df-out data fields with corresponding conv-data resulting in a converted df-out in the blob when tbc-data is valid;

activating a second orchestrating performance sequence App transferring converted df-out to a destination data store; and copying converted df-out from the blob to the file share archive resulting in an archive df-out and then deleting converted df-out from the blob.

6. The data transformation method as claimed in claim 5 wherein the tbc-data data value limits include numeric range values.

7. The data transformation method as claimed in claim 5 wherein the relationship is an algorithmic relationship which generates the conv-data.

8. A data transformation method comprising:

operating on a plurality of input data sources (d-s) comprising a plurality of discrete data files and discrete databases (df-in), each df-in having a plurality of df-in data fields each with to-be-converted data (tbc-data);

initially defining a plurality of output discrete data files and discrete databases (df-out), each df-out having a plurality of df-out data fields for converted data (conv-data);

initially defining data field validation rules including tbc-data field length, tbc-data format, and tbc-data data value limits;

initially defining data field ingestion rules including ingestion-data (i-d) field length, i-d data format, and tbc-data data value limits;

the data field ingestion rules further including one or more data field maps or look-up tables which either (i) define relationships between df-in data fields and df-out data fields and (ii) algorithmic operations on df-in data fields in operation, the data field ingestion rules generating conv-data for corresponding df-out data fields;

activating an application (App) for secure file transfer function (sft-App) in the presence of the one of the plurality of discrete data files or discrete databases (cl-source) which transfers the cl-source into a large data store for unstructured data (blob);

activating a copy App copying the cl-source from the blob to a file share archive resulting in an archive cl-source;

activating a first orchestrating performance sequence App on cl-source validating the tbc-data based upon the conversion rules;

generating corresponding error log entry when tbc-data in a corresponding df-in data field is invalid;

converting the tbc-data into conv-data with the conversion rules and activating a mapping orchestrating performance sequence App which populates the plurality of df-out data fields with corresponding conv-data resulting in a converted df-out in the blob when tbc-data is valid;

activating a second orchestrating performance sequence App applying the ingestion rules to generate converted df-out to a destination data store; and copying converted df-out from the blob to the file share archive resulting in an archive df-out and then deleting converted df-out from the blob.

\* \* \* \* \*